United States Patent
Bex et al.

(10) Patent No.: US 9,566,951 B2
(45) Date of Patent: Feb. 14, 2017

(54) WIPING DEVICE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 14/129,845

(22) PCT Filed: May 22, 2012

(86) PCT No.: PCT/EP2012/059487
§ 371 (c)(1),
(2), (4) Date: Dec. 27, 2013

(87) PCT Pub. No.: WO2013/000634
PCT Pub. Date: Jan. 3, 2013

(65) Prior Publication Data
US 2014/0130284 A1    May 15, 2014

(30) Foreign Application Priority Data

Jun. 28, 2011   (DE) .................. 10 2011 078 199

(51) Int. Cl.
*B60S 1/40* (2006.01)
*B60S 1/38* (2006.01)

(52) U.S. Cl.
CPC ............ *B60S 1/4064* (2013.01); *B60S 1/3853* (2013.01); *B60S 1/3858* (2013.01); *B60S 1/3881* (2013.01)

(58) Field of Classification Search
CPC ..... B60S 1/3851; B60S 1/3853; B60S 1/3858; B60S 1/3881; B60S 1/3856; B60S 1/386
USPC ......................... 15/250.43, 250.32
See application file for complete search history.

(56) References Cited

U.S. PATENT DOCUMENTS

| | | | |
|---|---|---|---|
| 2009/0056049 A1* | 3/2009 | Jarasson | B60S 1/381 15/250.32 |
| 2009/0188069 A1* | 7/2009 | Crabbe | B60S 1/38 15/250.32 |
| 2010/0037417 A1 | 2/2010 | Moll et al. | |

FOREIGN PATENT DOCUMENTS

| | | | |
|---|---|---|---|
| CN | 101233026 | | 7/2008 |
| DE | 10036115 | * | 1/2003 |
| DE | 112006002002 | | 6/2008 |
| EP | 2177407 | | 4/2010 |
| FR | 2893896 | | 6/2007 |
| JP | 2003500290 | | 1/2003 |
| RU | 2012507 | | 5/1994 |
| WO | 2010016000 | | 2/2010 |

OTHER PUBLICATIONS

International Search Report for Application No. PCT/EP2012/059487 dated Jul. 5, 2012 (English Translation, 3 pages).

* cited by examiner

*Primary Examiner* — Gary Graham
(74) *Attorney, Agent, or Firm* — Michael Best & Friedrich LLP

(57) ABSTRACT

The invention relates to a wiping device, in particular a wiping device for a motor vehicle pane, comprising a wiper blade adapter (12a-12c) that has at least one detent element (40a-40c, 42a-42c), said element being designed, when mounted, to prevent a movement of the wiper blade adapter (12a-12c) relative to a retaining element (10a-10c) in a longitudinal direction (22a-22c). According to the invention, the wiping device has at least one securing means (30a-30c, 32a-32c) that is provided in order to secure the at least one detent element (40a-40c, 42a-42c) when mounted.

21 Claims, 4 Drawing Sheets

WIPING DEVICE

BACKGROUND OF THE INVENTION

There is already known a wiping device, in particular a motor vehicle pane wiping device, having a wiper blade adapter which has at least one catch element, which is provided to prevent a movement of the wiper blade adapter relative to a retention element in a longitudinal direction in an assembled state.

SUMMARY OF INVENTION

The invention is based on a wiping device, in particular a motor vehicle pane wiping device, having a wiper blade adapter which has at least one catch element which is provided to prevent a movement of the wiper blade adapter relative to a retention element in a longitudinal direction in an assembled state.

It is proposed that the wiping device have at least one securing means, which is provided to secure the at least one catch element in an assembled state, whereby operational reliability can advantageously be increased. The term "wiper blade adapter" is intended in this context to refer in particular to an adapter which has a contact region with respect to a wiper blade component and which is connected to the wiper blade component in a non-releasable manner and is provided to provide a coupling region of the wiper blade component for coupling and/or contacting with a wiper arm adapter. The term "catch element" is intended in this context to refer in particular to a resilient element which is for producing a catch connection and which is provided to be resiliently redirected in the event of assembly. The term "retention element" in this context is intended in particular to refer to an element which is provided to connect a wind deflection element, a resilient element and a wiper strip in a positive-locking manner. The term "wind deflection element" is intended in this context to refer in particular to an element which is provided to deflect a relative wind acting on the wiping device, and/or to use it for pressing a wiper strip onto a vehicle pane. The term "wiper strip" in this context is intended in particular to refer to a strip which is provided to wipe a vehicle pane. The term "resilient element" in this context is intended in particular to refer to a resilient element which has at least an extent which in a normal operating state can be resiliently changed by at least 10%, in particular by at least 20%, preferably by at least 30% and in a particularly advantageous manner by at least 50%, and which produces in particular a counter-force which is dependent on a change of the extent, is preferably proportional to the change and counteracts the change. A "longitudinal direction" in this context is intended in particular to refer to a direction which extends substantially parallel with a longitudinal extent of the retention element. A "longitudinal extent" in this context is intended in particular to refer to the greatest extent possible. The term "substantially" in this context is intended in particular to refer to a deviation of less than 10°, preferably less than 5°. The term "extent" of an element in this context is intended in particular to refer to a maximum spacing of two locations of a perpendicular projection of the element onto a plane. The term "to secure" in this context is intended in particular to be understood to mean retain and/or lock in a fixed position. The term "provided" in this context is in particular intended to be understood to mean specifically configured and/or equipped.

In another embodiment of the invention, it is proposed that the at least one catch element be in lateral abutment with at least one resilient element in an assembled state, whereby a particularly compact structure of the wiping device can be achieved. The term "laterally" in this context is intended to be understood to be viewed particularly in a wiping direction. The term "wiping direction" in this context is intended in particular to refer to a direction in which the wiping device moves in an operating state relative to a surface to be wiped. The wiping direction preferably extends parallel with a surface to be wiped and/or perpendicularly relative to a main orientation of the wiper strip.

It is further proposed that at least one catch element be provided to be redirected at least substantially in a wiping direction during an assembly operation, whereby a particularly compact structural shape can be achieved with at the same time a high level of operational reliability.

In another embodiment of the invention, it is proposed that the at least one catch element have at least two catch arms, which are connected to the wiper blade adapter and which are provided to be resiliently redirected, whereby the catch element can absorb particularly high forces and transmit them to the wiper blade adapter.

It is further proposed that the at least one securing means be constructed in a barb-like manner, whereby particularly rapid assembly of the wiping device can be achieved.

It is further proposed that the at least one securing means be coupled to the catch element so that, when the catch element is redirected, the catch element moves into abutment with the at least one securing means and resiliently redirects it. An advantageously simple and rapid assembly of the wiping device can thereby be achieved.

In another embodiment of the invention, it is proposed that the wiping device have a retention element which is provided to couple the wiper blade adapter to a wiper strip and/or a resilient element, whereby the wiping device can be constructed in a particularly stable manner.

If the retention element has at least one securing recess, in which the at least one catch element engages in a positive-locking manner in an assembled state, a particularly simple assembly of the wiping device can be achieved.

It is further proposed that the securing recesses be at least partially arranged in a side wall which laterally delimits a longitudinal guiding channel, whereby a particularly compact structure of the wiping device can be achieved. The term "longitudinal guiding channel" in this context is intended in particular to refer to a guiding channel which extends parallel with a longitudinal direction of the retention element. The longitudinal guiding channel preferably comprises a free space and at least one channel wall which delimits the free space.

BRIEF DESCRIPTION OF THE DRAWINGS

Further advantages will be appreciated from the following description of the drawings. Three embodiments of the invention are illustrated in the drawings. The drawings, the description and the claims contain numerous features in combination. The person skilled in the art will advantageously also consider the features individually and combine them to form additional advantageous combinations.

In the drawings.

DETAILED DESCRIPTION

Figure 1:
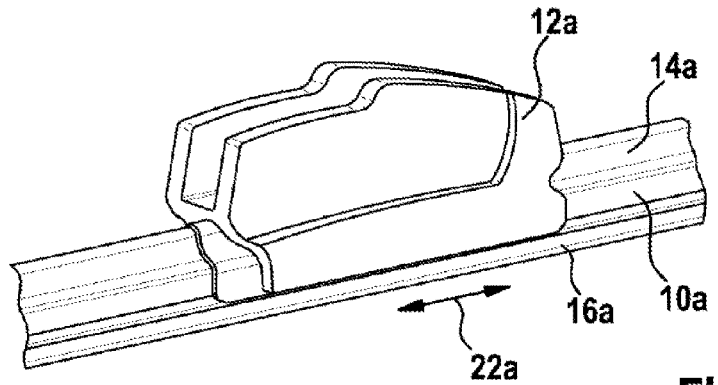
FIG. 1 is a perspective view of a wiping device according to the invention having a wiper blade adapter and a retention element.

FIG. 1 is a perspective view of a wiping device according to the invention having a retention element 10a, a wiper blade adapter 12a, a wind deflection element 14a and a wiper strip 16a in an assembled state. The wiper blade adapter 12a, the wind deflection element 14a and the wiper strip 16a are secured to the retention element 10a. The wiper blade adapter 12a is provided to be coupled to a wiper arm (not illustrated). By means of the retention element 10a, the wiper strip 16a is moved in an operating state, that is to say, when the wiper arm carries out a wiping movement, over a surface to be wiped (not illustrated). When relative wind is applied, the wind deflection element 14a deflects it and presses the wiping device onto the surface to be wiped.

Figure 2:
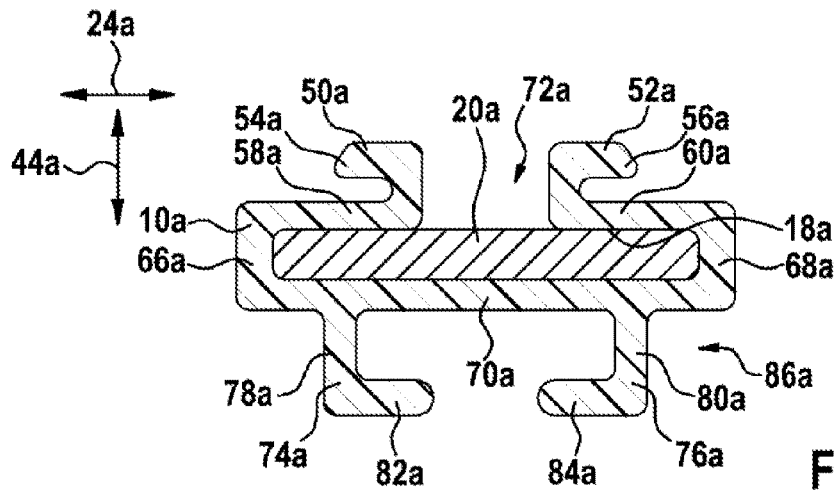
FIG. 2 is a sectioned illustration of the retention element according to FIG. 1.

FIG. 2 is a sectioned illustration of the retention element 10a, which has a longitudinal guiding channel 18a for guiding a resilient element 20a. The plane of section extends perpendicularly relative to a longitudinal direction 22a of the retention element 10a. The retention element 10a has two wind deflector securing elements 50a, 52a. The wind deflector securing elements 50a, 52a are constructed integrally with the retention element 10a. The term "integrally" is intended to be understood to mean in particular connected in a materially integral manner such as, for example, by means of a welding process and/or adhesive-bonding process, etc., and in a particularly advantageous manner formed on, as by means of production from a cast and/or production in a single or multi-component injection-molding method. The wind deflector securing elements 50a, 52a are orientated at the free ends 54a, 56a thereof in directions which face away from each other. Furthermore, the wind deflector securing elements 50a, 52a form two channel walls 58a, 60a which adjoin the longitudinal guiding channel 18a at a side remote from the wiper strip. The wind deflector securing elements 50a, 52a are constructed in a barb-like manner in the region of the free ends 54a, 56a thereof. The ends 54a, 56a are surrounded by the wind deflector element 14a in an assembled state.

In order to guide the resilient element 20a, side walls 66a, 68a of the longitudinal guiding channel 18c adjoin the channel walls 58a, 60a. The channel walls 58a, 60a in this instance form a right angle with the side walls 66a, 68a. On the side walls 66a, 68a, there is further arranged an intermediate wall 70a which terminates the longitudinal guiding channel 18a in the direction of the wiper strip 16a. The side walls 66a, 68a extend from the intermediate wall 70a in a direction which faces away from the wiper strip 16a. The retention element 10a has a longitudinal opening 72a which opens the longitudinal guiding channel 16a in the direction towards the wind deflector element 14a.

Two L-shaped guiding profiles 74a, 76a of the retention element 10a are arranged on the intermediate wall 70a. The guiding profiles 74a, 76a are constructed integrally with the retention element 10a. The guiding profiles 74a, 76a each have a lateral guide 78a, 80a and each have a vertical guide 82a, 84a. The vertical guides 82a, 84a form an angle of 90° with the lateral guides 78a, 80a, respectively. The lateral guides 78a, 80a each form an angle of 90° with respect to the intermediate wall 70a. The guiding profiles 74a, 76a are orientated at their free ends of the vertical guides 82a, 84a in directions which face each other. The guiding profiles 74a, 76a and the intermediate wall 70a form a sealing strip 86a, into which the wiper strip 16a is introduced in an assembled state.

The retention element 10a is integrally produced in an extrusion method from polypropylene. A person skilled in the art will in this context consider various plastics materials which appear to be advantageous, such as in particular polyethylene, polyamide, polyvinyl chloride, polycarbonate and/or polystyrene.

Figure 3:
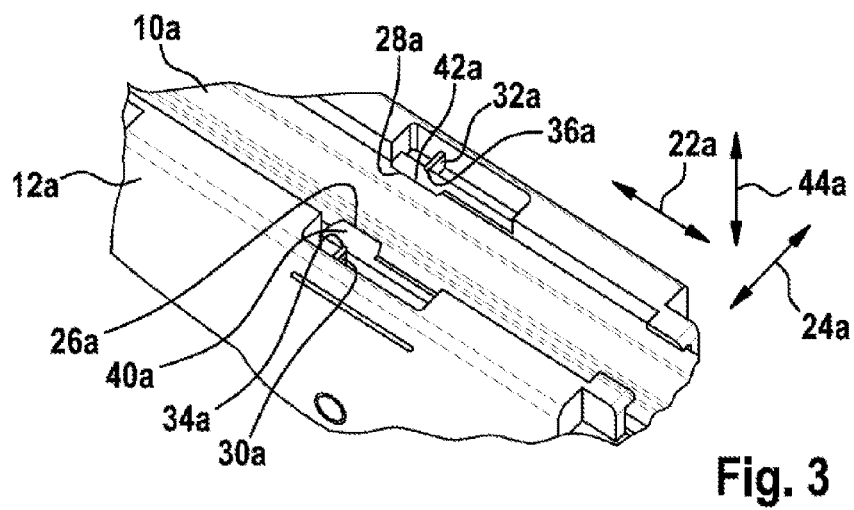
FIG. 3 is a detailed perspective view of the wiper blade adapter and the retention element according to FIG. 1.

The retention element 10a has two securing recesses 26a, 28a, which are provided to form a positive-locking connection with a wiper blade adapter 12a (FIG. 3). The securing recesses 26a, 28a are arranged in the side walls 66a, 68a which laterally delimit the longitudinal guiding channel 18a.

As FIG. 3 further shows, the wiper blade adapter 12a has two catch elements 40a, 42a, which in the assembled state prevent a movement of the wiper blade adapter 12a relative to the retention element 10a in the longitudinal direction 22a. The catch elements 40a, 42a can each be resiliently redirected about a vertical axis which extends parallel with a vertical direction 44a. The catch elements 40a, 42a laterally abut the resilient element 20a. In this instance, the catch elements 40a, 42a engage in catch recesses (not illustrated) of the resilient element 20a and thus prevent a movement of the wiper blade adapter 12a relative to the resilient element 20a in the longitudinal direction 22a.

The wiping device comprises two securing means 30a, 32a which secure the catch elements 40a, 42a in the assembled state. The securing means 30a, 32a are constructed integrally with the wiper blade adapter 12a. During assembly, the catch elements 40a, 42a are firstly redirected in a wiper direction 24a. The retention element 10a is pushed by the wiper blade adapter 12a in the longitudinal direction 22a. As soon as the securing recesses 26a, 28a are located at the height of the catch elements 40a, 42a, they engage in the securing recesses 26a, 28a and form a positive-locking connection with the retention element 10a in the longitudinal direction 22a. The securing means 30a, 32a can each be pivoted about a vertical axis which extends parallel with the vertical direction 44a. The vertical direction 44a extends perpendicularly relative to the longitudinal direction 22a and perpendicularly relative to the wiping direction 24a. Consequently, the vertical direction 44a in an operating state is at least substantially perpendicular relative to a surface to be wiped (not illustrated).

During a securing operation, the securing means 30a, 32a are pivoted about the vertical axes and engage with the free ends thereof in a securing groove 34a, 36a, respectively. The securing means 30a, 32a are thereby prevented from pivoting back. The securing means 30a, 32a are orientated with the free ends thereof in directions which face each other.

Two further embodiments of the invention are shown in FIGS. 4 to 9. The following descriptions are limited substantially to the differences between the embodiments, reference being able to be made to the description of the first embodiment with regard to components, features and functions which remain the same. In order to distinguish between the embodiments, the letter a in the reference numerals of the embodiment in FIGS. 1 to 3 is replaced with the letters b and c in the reference numerals of the embodiments of FIGS. 4 to 9. With regard to components having the same designation, in particular with regard to components having the same reference numerals, reference may also be made in principle to the drawings and/or the description of the first embodiment.

Figure 4:
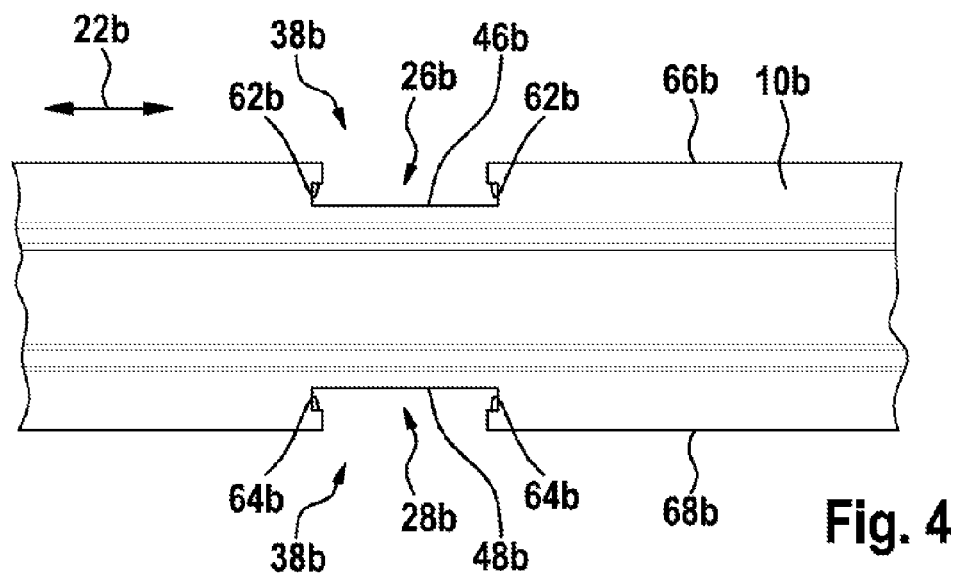
FIG. 4 is a plan view of another embodiment of a retention element of a wiping device according to the invention.

FIG. 4 is a plan view of a retention element 10b of another embodiment of the wiping device. The retention element 10b has a cross-section as shown in FIG. 2. The retention element 10b has two securing recesses 26b, 28b which, when viewed in a longitudinal direction 22b, are arranged at the same height. The securing recesses 26b, 28b each have a t-shaped contour 38b. A lateral opening of the respective securing recess 26b, 28b in this instance has a smaller longitudinal extension than an inner wall 46b, 48b which is arranged in the securing recess 26b, 28b. The securing recesses 26b, 28b are arranged in side walls 66b, 68b which laterally delimit a longitudinal guiding channel 18b.

Figure 5:
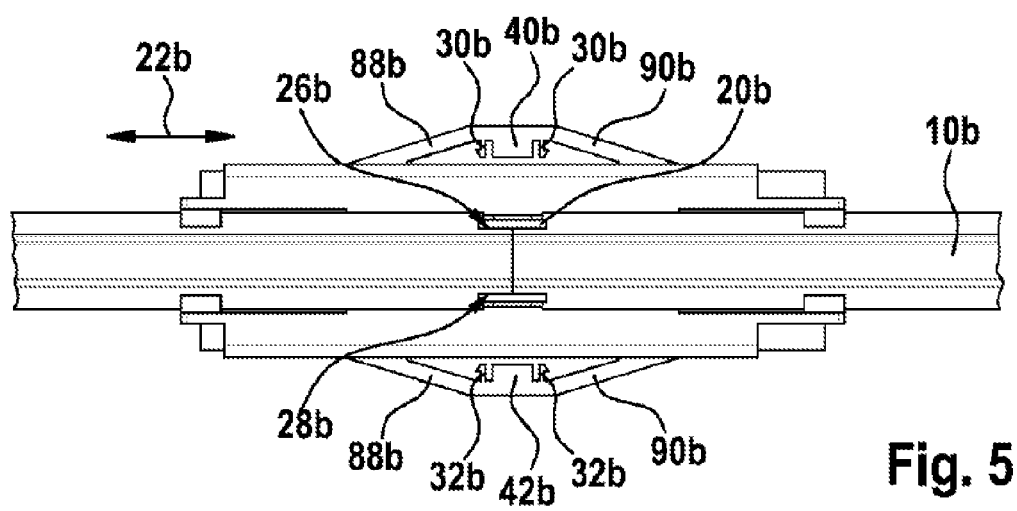
FIG. 5 is a plan view of the retention element according to FIG. 4 having a wiper blade adapter.

A wiper blade adapter 12b has two catch elements 40b, 42b which in an assembled state are in lateral abutment with the resilient element 20b and prevent a movement of the wiper blade adapter 12b relative to the resilient element 20b in the longitudinal direction 22b (FIG. 5). The catch elements 40b, 42b engage in catch recesses which are arranged laterally in the resilient element 20b (not illustrated). The two catch elements 40b, 42b each have two catch arms 88b, 90b, which are each connected to the wiper blade adapter 12b. The catch arms 88b, 90b extend in their main extent direction parallel with the longitudinal direction 22b. The catch arms 88b, 90b are constructed integrally with the retention element 10b.

The wiping device comprises two securing means 30b, 32b, which secure the catch elements 40b, 42b in the assembled state. The securing means 30b, 32b are each constructed integrally with the catch elements 40b, 42b. During an assembly operation, the retention element 10b is inserted into the wiper blade adapter 12b in the longitudinal direction 22b. As soon as the retention element 10b is located in an assembly position, the catch elements 40b, 42b are moved in a wiping direction 24b into the securing recesses 26b, 28b. In this instance, the catch elements 40b, 42b are moved counter to a resilient force. The catch elements 40b, 42b engage in the securing recesses 26b, 28b and form a positive-locking connection with the retention element 10b in the longitudinal direction 22b.

The securing means 30b, 32b can each be resiliently redirected about a vertical axis which extends parallel with a vertical direction 44b. The vertical direction 44b extends perpendicularly relative to the longitudinal direction 22b and perpendicularly relative to the wiping direction 24b. Consequently, the vertical direction 44b is located in an operating state at least substantially perpendicularly relative to a surface to be wiped (not illustrated). The securing means 30b, 32b are constructed in a barb-like manner. If the catch elements 40b, 42b are introduced completely into the securing recesses 26b, 28b, the securing means 30b, 32b engage in the securing recesses 26b, 28b and are in abutment with rear walls 62b, 64b of the securing recesses 26b, 28b. The catch elements 40b, 42b are consequently prevented from moving out of the securing recesses 26b, 28b.

Figure 6:
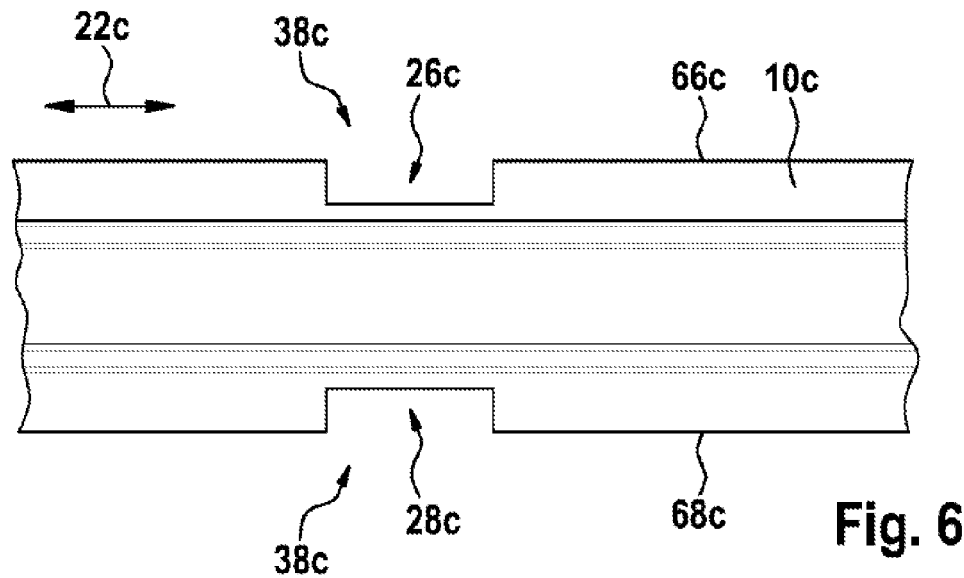
FIG. 6 is a plan view of another embodiment of a retention element of a wiping device according to the invention.

FIG. 6 is a plan view of a retention element 10c of another embodiment of the wiping device. The retention element 10c has a cross-section as shown in FIG. 2. The retention element 10c has two securing recesses 26c, 28c which, when viewed in a longitudinal direction 22c, are arranged at the same height. The securing recesses 26c, 28c each have a rectangular contour 38c. The securing recesses 26c, 28c are arranged in side walls 66c, 68c which laterally delimit a longitudinal guiding channel 18c.

Figure 7:
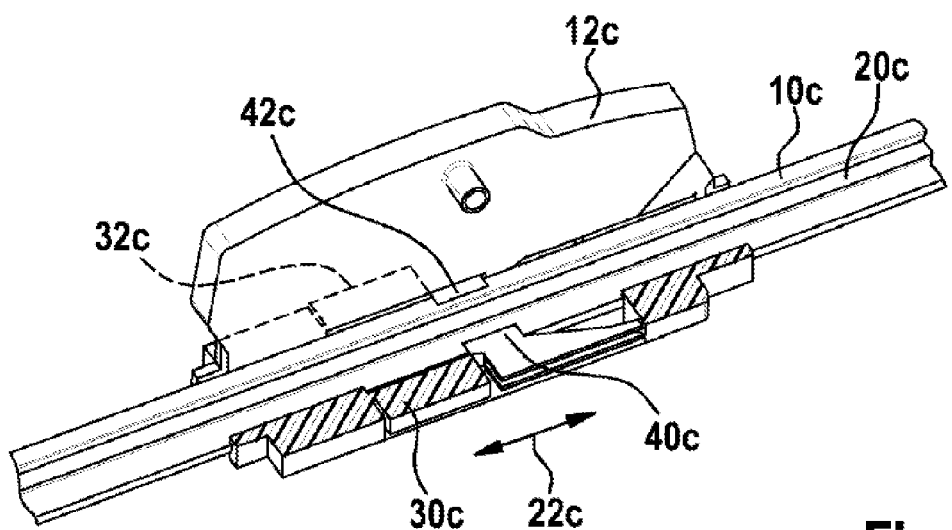
FIG. 7 is a part-section of a wiper blade adapter having the retention element of the wiping device according to FIG. 6.

FIG. 7 is a perspective view of the retention element 10c, which is inserted into a wiper blade adapter 12c. The wiper blade adapter 12c is illustrated as a part-section.

The wiper blade adapter 12c has two catch elements 40c, 42c, which in an assembled state are in lateral abutment with a resilient element 20c and prevent a movement of the wiper blade adapter 12c relative to the resilient element 20c in the longitudinal direction 22c. In this instance, the catch elements 40c, 42c engage in catch recesses which are laterally arranged in the resilient element 20c. The catch elements 40c, 42c are integrally constructed with the wiper blade adapter 12c.

Figure 8:
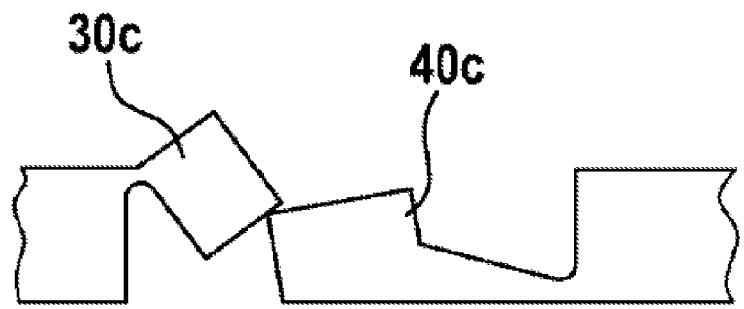
FIG. 8 is a schematic illustration of catch elements of the wiper blade adapter according to FIG. 6 in an open state.
Figure 9:
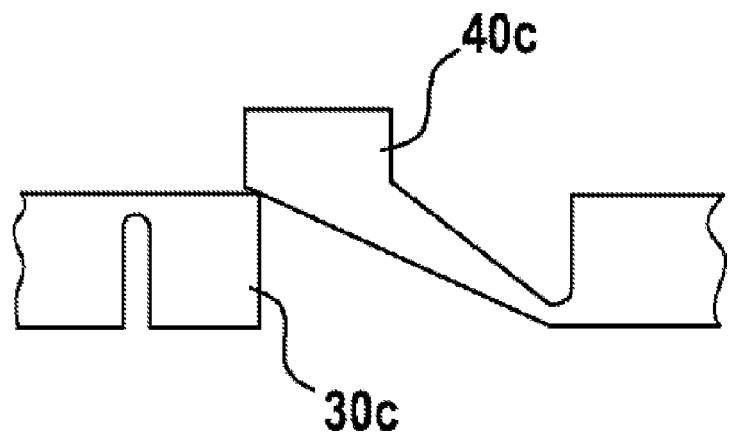
FIG. 9 is a schematic illustration of catch elements of the wiper blade adapter according to FIG. 6 in a locked state.

The wiping device comprises securing means 30c, 32c which each secure a catch element 40c, 42c in the assembled state. The securing means 30c, 32c are coupled to the catch element 40c, 42c. When the catch elements 40c, 42c are redirected, the catch elements 40c, 42c move into abutment with the securing means 30c, 32c and resiliently redirect them. FIGS. 8 and 9 schematically illustrate the operating method of the catch element 40c and a securing means 30c during an assembly operation.

During an assembly operation, the retention element 10c is inserted into the wiper blade adapter 12c in a longitudinal direction 22c. As soon as the retention element 10c is located in an assembly position, the catch elements 40c, 42c are moved in a wiping direction 24c into the securing recesses 26c, 28c. In this instance, the securing means 30c, 32c are first redirected counter to a resilient force. The catch elements 40c, 42c engage in the securing recesses 26c, 28c and form a positive-locking connection with the retention element 10c in the longitudinal direction 22c. The securing means 30c, 32c move resiliently into a securing position in which a movement of the catch elements 40c, 42c out of the securing recesses 26c, 28c is prevented.

The securing means 30c, 32c can each be resiliently redirected about a vertical axis, which extends parallel with the vertical direction 44c. The vertical direction 44c extends perpendicularly relative to the longitudinal direction 22c and perpendicularly relative to the wiping direction 24c. Consequently, the vertical direction 44c is located in an operating state at least substantially perpendicularly relative to a surface to be wiped (not illustrated).

What is claimed is:

1. A wiping device, having a wiper blade adapter (12a-12c) which has at least one catch element (40a-40c, 42a-42c), which prevents a movement of the wiper blade adapter (12a-12c) relative to a retention element (10a-10c) in a longitudinal direction (22a-22c) in an assembled state, the retention element being configured to connect a wind deflection element, a resilient element and a wiper strip in a positive-locking manner, characterized by at least one securing means (30a-30c, 32a-32c) which is provided to secure the at least one catch element (40a-40c, 42a-42c) in the assembled state, wherein the retention element (10a-10c) includes walls that define at least one securing recess (26a-26c, 28a-28c) along the retention element (10a-10c), and wherein the at least one securing means (30a-30c, 32a-32c) is configured to flex and engage in a positive-locking manner into the at least one securing recess (26a-26c, 28a-28c) and against the walls in the assembled state.

2. The wiping device as claimed in claim 1, characterized in that the at least one catch element (40a-40c, 42a-42c) is in lateral abutment with at least one resilient element (20a-20c) in the assembled state.

3. The wiping device as claimed in claim 1, characterized in that the at least one catch element (40a-40c, 42a-42c) is provided to be redirected at least substantially in a wiping direction (24a-24c) during an assembly operation.

4. The wiping device as claimed in claim 1, characterized in that the at least one catch element (40b, 42b) has at least two catch arms (88b, 90b) which are connected to the wiper blade adapter (12b) and which are provided to be resiliently redirected.

5. The wiping device as claimed in claim 1, characterized in that the at least one securing means (30b, 32b) is barb shaped.

6. The wiping device as claimed in claim 1 and further comprising the retention element (10a-10c).

7. The wiping device as claimed in claim 1, characterized in that the at least one securing recess (26a-26c, 28a-28c) is disposed along at least one side wall (66a-66c) of the retention element (10a-10c).

8. A wiper blade comprising the wiper blade adapter and the retention element (10a-10c) as claimed in claim 1, and also comprising the resilient element (20a-20c), the wind deflection element (14a-14c), the wiper blade adapter (12a-12c) and the wiper strip (16a-16c).

9. The wiping device as claimed in claim 1 and further comprising the retention element (10a-10c) which is configured to couple the wiper blade adapter (12a-12c) to the wiper strip (16a-16c).

10. The wiping device as claimed in claim 1 and further comprising the retention element (10a-10c) which is configured to couple the wiper blade adapter (12a-12c) to the resilient element (20a-20c).

11. The wiping device as claimed in claim 1 and further comprising the wiper strip (16a-16c) coupled to the wiper blade adapter.

12. The wiping device as claimed in claim 11 and further comprising the wind deflector coupled to the wiper blade adapter.

13. The wiping device as claimed in claim 12 and further comprising the retention element which couples the wiper strip (16a-16c) and the wind deflector to the wiper blade adapter.

14. The wiping device as claimed in claim 13 and further comprising the resilient element coupled to the wiper blade adapter.

15. The wiping device as claimed in claim 1, characterized in that the at least one catch element (40a-40c, 42a-42c) includes two catch elements (40b, 42b) and the at least one securing recess (26a-26c, 28a-28c) includes two securing recesses (26b, 28b), wherein each of the catch elements (40b, 42b) includes two catch arms (88b, 90b) which are connected to the wiper blade adapter (12b) and which are provided to be resiliently redirected along a wiping direction (24a-24c) toward one of the two securing recesses (26b, 28b).

16. The wiping device as claimed in claim 15, wherein the two catch arms (88b, 90b) of each catch element (40b, 42b) each extend at an oblique angle relative to the longitudinal direction (22a-22c).

17. The wiping device as claimed in claim 1, wherein the at least one catch element (40a-40c, 42a-42c) includes a protrusion configured to extend into the at least one securing recess (26a-26c, 28a-28c), and wherein the at least one securing means (30a-30c, 32a-32c) includes two securing means (30b, 32b), one on either side of the protrusion.

18. The wiping device as claimed in claim 17, wherein the two securing means (30b, 32b) are disposed between two catch arms (88b, 90b), and wherein each of the two catch arms extend at an oblique angle relative to the longitudinal direction (22a-22c).

19. The wiping device as claimed in claim 1, wherein the at least one securing means (30a-30c, 32a-32c) is resiliently deflectable about a vertical axis that extends perpendicular to both the longitudinal direction (22a-22c) and the wiping direction (24a-24c).

20. The wiping device as claimed in claim 1, wherein the at least one securing recess (26a-26c, 28a-28c) is T-shaped.

21. The wiping device as claimed in claim 1, wherein the at least one catch element (40a-40c, 42a-42c) and the at least one securing means (30a-30c, 32a-32c) includes a single catch element (40a-40c, 42a-42c) and two securing means (30a-30c, 32a-32c) that together are configured to extend into a single one of the at least one securing recess (26a-26c, 28a-28c).

* * * * *